Jan. 6, 1970

TAKURO BOJO 3,488,593

FREQUENCY CONVERTER CIRCUIT CHANGEABLE TO AN AUDIO FREQUENCY AMPLIFIER

Filed Nov. 19, 1965

INVENTOR

Takuro Bojo

BY Stevens, Davis, Miller & Mosher

ATTORNEYS

United States Patent Office 3,488,593
Patented Jan. 6, 1970

3,488,593
FREQUENCY CONVERTER CIRCUIT CHANGEABLE TO AN AUDIO FREQUENCY AMPLIFIER

Takuro Bojo, Yokohama, Japan, assignor to Victor Company of Japan, Limited, Yokohama, Japan, a corporation of Japan Filed Nov. 19, 1965, Ser. No. 508,720
Claims priority, application Japan, Nov. 30, 1964, 39/66,977
Int. Cl. H04b *1/06, 1/20*
U.S. Cl. 325—311 6 Claims

ABSTRACT OF THE DISCLOSURE

A radio-phonograph circuit including a transistor, an input circuit for receiving broadcast signals, input terminals for receiving reproduced record signals, and a transfer switch connected to the base electrode of the transistor and for switching over said input circuit and said input terminals is disclosed. The transistor circuit operates as a frequency converter circuit of grounded emitter type and a broadcast output signal frequency converted to an intermediate frequency is developed from a circuit connected to the collector electrode of the transistor when the transfer switch is switched over to the input circuit for receiving broadcast signals. The transistor circuit operates as an audio frequency amplifier of grounded collector type when the transfer switch is swiitched over to the input terminals for receiving reproduced record signals. The audio output signal is developed across a suitable impedance connected to the emitter. The impedance connected to the collector is negligible at audio frequencies.

The present invention relates to an improvement of a circuit in a broadcasting receiving set, such as a radio receiver etc. to which a record playing device etc. may be added, and especially relates to a radio receiver circuit in which a frequency converter circuit and an audio frequency amplifier circuit are used in common.

Hitherto, when a record playing device such as a record player etc. is added to a radio receiver for producing a sound from a speaker of the radio receiver, the input impedance of the audio frequency amplifier must be high, so that an exclusive transistor for the play back, of a record is required for the radio receiver.

In the present invention, the frequency converter circuit of the radio receiver, not operating the play back of said record, is utilized for matching the circuit of a crystal pick-up etc. of the record player as an audio frequency high input impedance amplifier. According to this invention, the exclusive transistor for the play back of said record can be eliminated, and further resistances connected to the base, emitter and collector electrodes of said transistor and some condensors can be omitted. Accordingly, the circuit constitution becomes simple and the manufacturing cost of said radio receiver can be reduced.

A main object of the present invention is to produce a radio receiver circuit in which the circuit constitution is simplified by using a frequency converter circuit and an audio frequency amplifier circuit in common in a broadcasting receiving set such as a radio receiver etc., to which a record playing device can be added.

Another object of the present invention is to produce an inexpensive radio receiver circuit in which some circuit parts can be omitted compared with a conventional circuit.

Further objects and other characteristics of the present invention will be apparent from the following explanation referring to the drawings.

The present invention will be explained referring to the embodiments shown in drawings.

Figure 1:
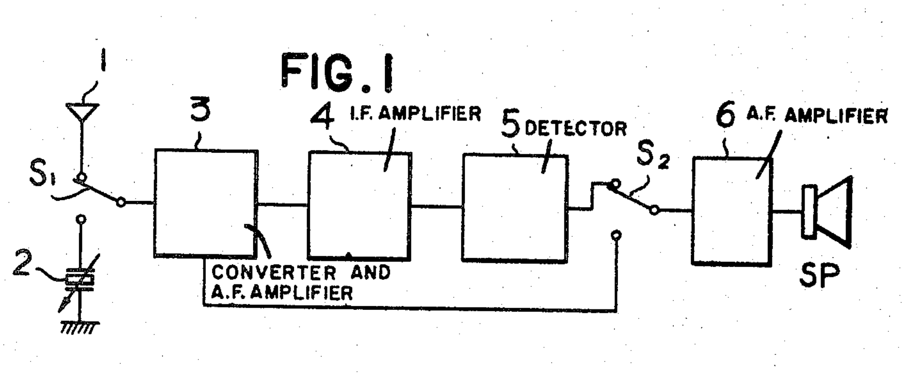
FIG. 1 is a block diagram of a radio receiver to which the present invention can be applied.

FIG. 1 is a block diagram of an apparatus in which a broadcasting receiver and a record playing device are combined according to the present invention. 1 is an antenna, 2 is a crystal pick-up of a record playing device, $S_1$ is a transfer switch of said antenna and record playing device, and 3 is a converter circuit for receiving the broadcasting signal and is used as an AF amplifier in case of record playing. 4 is an IF amplifier, 5 is a detector, and $S_2$ is a transfer switch cooperated with said transfer switch $S_1$ and may switch the output side of the detector 5 and the output side of the AF amplifier of said circuit 3 in case of record playing. 6 is an AF amplifier for amplifying either output signal of the detector 5 or the circuit 3 operated as an AF amplifier according to the operation of the transfer switch $S_1$, and SP is a speaker.

Figures 2, 3:
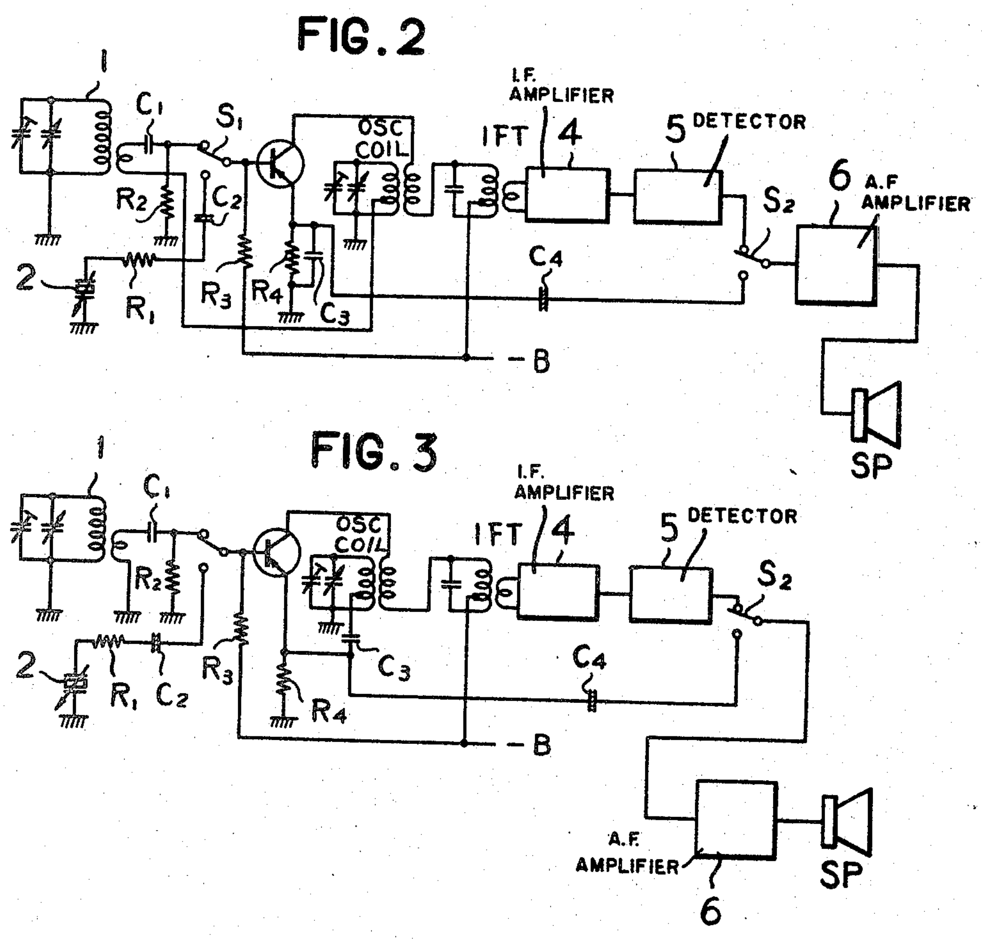
FIG. 2 is a circuit showing one embodiment of the circuit according to the present invention.
FIG. 3 is a circuit showing another embodiment of the circuit according to the present invention.

FIG. 2 shows a converter circuit of the base injection type, illustrating one embodiment of this invention, and in a condition shown in this figure, the transfer switches $S_1$ and $S_2$ are in the state for receiving the radio signal.

In the case of receiving a radio frequency signal, the circuit is a frequency converter circuit of the type in which both the incoming signal and oscillation signal are injected to the signal base electrode, $C_1$ is a direct current stopping condenser, and $R_2$, $R_3$ are resistors for determining the bias voltage in such a way that the conversion gain may become the largest and as this resistor $R_3$ becomes a fixed bias resistance in case of AF amplifying, the resistance of the resistor is determined to a most suitable value for the AF amplifier. Only the resistor $R_2$ is varied for determining the bias voltage for the frequency converter circuit.

When the resistance of a resistor $R_4$ is made small, the stability factor becomes larger and the input impedance as an AF amplifier is lowered, so that it cannot be appreciably small. When it is large, the emitter voltage becomes high, and the voltage between the collector and emitter is lowered and the converting gain is lowered, so that it cannot be made appreciably large.

Further, in the present embodiment, the numerical value of each part described above may be selected as follows:

| | |
|---|---|
| $R_2$ | 47K |
| $R_3$ | 330K |
| $R_4$ | 4.7K |
| C ---- μf. | 0.002 |

Further, when it works as the AF amplifier, the load of the collector circuit, that is the oscillator coil and IFT have negligible impedance for the audio frequency and are the same as if they were short circuited equivalently, and the collector circuit operates as a grounded collector circuit, operates as a grounded collector circuit, accordingly the output must be taken out from the emitter. $C_3$ is a bypass condenser for the frequency converter circuit, and yet the impedance for the audio frequency is large enough, so that it acts as if it were omitted. When the high frequency components of the audio frequency signal are wished to be cut, if the condenser $C_3$ is selected suitably, the frequency characteristics of the audio frequency amplifier can be varied. $C_4$ is a direct current stopping condenser. The input impedance $Ri$ of the transistor when working as the AF amplifier is expressed as follows:

$$Ri=(1+\beta)R_4$$

Input impedance $R_I$ observed from $C_2$ is as follows:

$$R_I = Ri \cdot R_3 / Ri + R_3$$

In the practical circuit, resistance of the resistor $R_I$ is limited by resistances of the resistors $R_4$, $R_3$ and $\beta$, and it is difficult to take sufficient matching with the pick-up etc. of high impedance, so that the matching is taken by inserting the resistor $R_1$.

Now, the numerical value of each part described above may be selected as follows:

| | |
|---|---|
| $R_1$ | 470K. |
| $C_3$ | 0.005 $\mu$f. |
| $C_4$ | 10 $\mu$f./6 v. |

FIG. 3 shows another frequency converter circuit according to the present invention in which an oscillation voltage is injected to an emitter electrode and a radio frequency sginal is injected to a base electrode.

In operation as the AF amplifier, it is essentially the same as the embodiment of FIG. 2 theoretically. The condenser $C_3$ is connected between a tap of the oscillator coil and the emitter.

As the impedance between the tap and the earth is nearly zero for the audio frequencies, it may be considered as a short circuit, namely it is same as the circuit of FIG. 2.

What I claim is:

1. A radio-phonograph circuit comprising a transistor having a base electrode, a collector electrode and an emitter electrode, a first input circuit for receiving broadcast signals, a second input circuit for receiving reproduced audio record signals, means for selectively switching said first input circuit and said second input circuit to said base electrode of said transistor, an oscillator coil, means for developing a local oscillator signal from said oscillator coil, an intermediate frequency load circuit having a low impedance to audio frequencies connected to said collector electrode, an audio frequency load circuit connected to said emitter electrode, means for forming a frequency converter circuit of grounded emitter type by coupling said first input circuit to said base electrode of said transistor wherein an intermediate frequency output is developed from said intermediate frequency load circuit, and means for forming an audio frequency amplifier of grounded collector type by coupling said second input circuit to said base electrode of said transistor wherein an audio frequency output signal is developed from said audio frequency load circuit.

2. A circuit according to claim 1, wherein a radio frequency feedback circuit is connected between an oscillator coil coupled to said collector electrode and said base electrode.

3. A circuit according to claim 1, wherein a radio frequency feedback circuit is connected between an oscillator coil coupled to said collector electrode and said emitter electrode.

4. A radio-photograph circuit comprising a transistor having a base electrode, a collector electrode and an emitter electrode, a first input circuit for receiving broadcast signals, a second input circuit for receiving reproduced audio record signals, means for selectively switching said first input circuit and said second input circuit to said base electrode of said transistor, an oscillator coil, means for developing a local oscillator signal from said oscillator coil, an intermediate frequency load circuit having a low impedance to audio frequencies connected to said collector electrode, an audio frequency load circuit connected to said emitter electrode, means for forming a frequency converter circuit of grounded emitter type by coupling said first input circuit to said base electrode of said transistor wherein an intermediate frequency output is developed from said intermediate frequency load circuit, means for forming an audio frequency amplifier of grounded collector type by coupling said second input circuit to said base electrode of said transistor wherein a first audio frequency output is developed from said audio frequency load circuit, means for coupling said intermediate frequency output to an intermediate frequency amplifier circuit providing an amplified intermediate frequency signal, means for coupling said amplified intermediate frequency signal to means for detecting said amplified intermediate frequency signal and for providing a second audio frequency output signal, and means for selectively switching said first audio frequency output signal and said second audio frequency output signal to means for producing sound from audio frequency signals.

5. A circuit according to claim 4, wherein a radio frequency feedback circuit is connected between an oscillator coil coupled to said collector electrode and said base eletrode.

6. A circuit according to claim 4, wherein a radio frequency feedback circuit is connected between an oscillator coil coupled to said collector electrode and said emitter electrode.

References Cited

UNITED STATES PATENTS

| | | | |
|---|---|---|---|
| 2,488,936 | 11/1949 | Roberts | 179—100.11 |
| 2,548,531 | 4/1951 | Hayes | 179—100.11 |
| 2,558,820 | 7/1951 | Cheney | 179—100.11 |
| 2,836,663 | 5/1958 | Blinoff et al. | 179—100.11 |
| 2,886,653 | 5/1959 | Lin | 179—100.11 |
| 2,950,356 | 8/1960 | Stott | 325—310 XR |

ROBERT L. GRIFFIN, Primary Examiner

R. S. BELL, Assistant Examiner

U.S. Cl. X.R.

179—100.11; 325—443, 491